(12) United States Patent
Frick (10) Patent No.: US 11,971,988 B2
(45) Date of Patent: Apr. 30, 2024

(54) DETECTION OF SUSPICIOUS OBJECTS IN CUSTOMER PREMISES EQUIPMENT (CPE)

(71) Applicant: ARRIS Enterprises LLC, Suwanee, GA (US)

(72) Inventor: Matt Frick, Martinez, CA (US)

(73) Assignee: ARRIS ENTERPRISES LLC, Horsham, PA (US)

(*) Notice: Subject to any disclaimer, the term of this patent is extended or adjusted under 35 U.S.C. 154(b) by 255 days.

(21) Appl. No.: 16/213,263

(22) Filed: Dec. 7, 2018

(65) Prior Publication Data

US 2020/0184071 A1 Jun. 11, 2020

(51) Int. Cl.
G06F 21/56 (2013.01)
G06F 16/17 (2019.01)
G06F 21/64 (2013.01)

(52) U.S. Cl.
CPC ........ *G06F 21/565* (2013.01); *G06F 16/1734* (2019.01); *G06F 21/64* (2013.01); *G06F 2221/034* (2013.01)

(58) Field of Classification Search
CPC .............. G06F 21/565; G06F 16/1734; G06F 2221/034; G06F 21/57
USPC .......................................................... 726/23
See application file for complete search history.

(56) References Cited

U.S. PATENT DOCUMENTS

| | | | | |
|---|---|---|---|---|
| 5,577,105 A * | 11/1996 | Baum | ................. | H04M 11/066 379/93.05 |
| 6,625,255 B1 * | 9/2003 | Green | ................. | H04M 3/30 379/1.04 |
| 7,080,407 B1 * | 7/2006 | Zhao | ................. | G06F 21/554 713/188 |
| 7,444,398 B1 * | 10/2008 | Matthews | ................. | H04L 9/40 709/224 |
| 7,640,571 B1 | 12/2009 | Reichgott | | |
| 7,685,254 B2 * | 3/2010 | Pandya | ............. | G06F 16/90344 709/200 |
| 8,745,001 B1 * | 6/2014 | Goldschmidt | ...... | G06F 11/1448 707/645 |

(Continued)

FOREIGN PATENT DOCUMENTS

| EP | 1540502 B1 * | 3/2011 | ............. H04L 29/06 |
|---|---|---|---|
| EP | 2321934 B1 * | 6/2014 | ............. H04L 47/10 |

(Continued)

*Primary Examiner* — Saleh Najjar
*Assistant Examiner* — Peiliang Pan
(74) *Attorney, Agent, or Firm* — Wenderoth, Lind & Ponack, L.L.P.

(57) ABSTRACT

A method is provided for validating an inventory of files in a file system of a customer premises equipment (CPE). The method includes developing a database containing a file system inventory of a validated CPE operating in different scenarios or under different operating conditions that may include different networks, different service provider configurations and different end user feature settings. The validated CPE will be allowed to operate in these different scenarios so that an inventory of files and their attributes may be obtained at different times, such as after a reboot, after a change in software feature configurations, and so on. A file system inventory of a CPE system under test is obtained and each entry in the inventory is compared to the entries in the validated file system database to identify unexpected discrepancies.

9 Claims, 5 Drawing Sheets

(56) References Cited

U.S. PATENT DOCUMENTS

| | | | | |
|---|---|---|---|---|
| 9,185,020 B2* | 11/2015 | Ezick | | H04L 43/18 |
| 9,256,738 B2* | 2/2016 | Xue | | H04L 67/535 |
| 9,292,688 B2* | 3/2016 | Avasarala | | G06F 21/56 |
| 9,959,407 B1* | 5/2018 | Li | | G06F 21/56 |
| 10,397,263 B2* | 8/2019 | Sun | | H04L 63/0245 |
| 10,817,608 B2* | 10/2020 | Tseng | | G06F 21/566 |
| 11,190,540 B2* | 11/2021 | Hittel | | G06F 21/552 |
| 11,308,207 B2* | 4/2022 | Chelarescu | | G06F 21/568 |
| 11,341,242 B2* | 5/2022 | Tseng | | G06N 20/00 |
| 11,343,280 B2* | 5/2022 | Kraemer | | H04L 63/1433 |
| 2002/0152373 A1* | 10/2002 | Sun | | H04L 41/08 |
| | | | | 713/150 |
| 2003/0012548 A1* | 1/2003 | Levy | | G06Q 30/0236 |
| | | | | 386/251 |
| 2003/0041336 A1 | 2/2003 | Del Sordo | | |
| 2003/0061604 A1 | 3/2003 | Elcock | | |
| 2005/0120063 A1* | 6/2005 | Koestler | | G06F 21/64 |
| 2005/0174937 A1* | 8/2005 | Scoggins | | H04M 7/006 |
| | | | | 370/230 |
| 2006/0174343 A1* | 8/2006 | Duthie | | H04L 51/212 |
| | | | | 726/23 |
| 2006/0212933 A1* | 9/2006 | Scoggins | | H04M 7/006 |
| | | | | 726/11 |
| 2006/0259587 A1* | 11/2006 | Ackerman | | G06Q 20/3678 |
| | | | | 709/219 |
| 2007/0073733 A1* | 3/2007 | Matthews | | H04L 41/085 |
| 2007/0239841 A1* | 10/2007 | Lehrman | | H04N 21/235 |
| | | | | 709/217 |
| 2008/0127067 A1 | 5/2008 | Aubertine | | |
| 2010/0154009 A1 | 6/2010 | Del Sordo | | |
| 2010/0169420 A1* | 7/2010 | McCoy | | H04L 12/2825 |
| | | | | 709/204 |
| 2010/0174770 A1* | 7/2010 | Pandya | | G06F 16/951 |
| | | | | 709/200 |
| 2010/0229219 A1* | 9/2010 | Mendonca | | H04L 9/3271 |
| | | | | 726/4 |
| 2012/0304311 A1 | 11/2012 | Kline | | |
| 2013/0014147 A1* | 1/2013 | Hadfield | | H04H 60/43 |
| | | | | 725/14 |
| 2013/0247117 A1* | 9/2013 | Yamada | | H04W 4/029 |
| | | | | 340/12.5 |
| 2014/0003342 A1* | 1/2014 | Sheriff | | H04W 36/24 |
| | | | | 370/328 |
| 2014/0013434 A1* | 1/2014 | Ranum | | H04L 67/10 |
| | | | | 726/24 |
| 2014/0180915 A1* | 6/2014 | Montulli | | H04L 51/08 |
| | | | | 705/40 |
| 2014/0181027 A1* | 6/2014 | Whitehead | | G06F 11/14 |
| | | | | 707/639 |
| 2014/0181039 A1* | 6/2014 | Harrison | | G06F 16/164 |
| | | | | 707/652 |
| 2014/0181051 A1* | 6/2014 | Montulli | | G06F 11/1464 |
| | | | | 707/679 |
| 2014/0181579 A1* | 6/2014 | Whitehead | | G06F 11/1451 |
| | | | | 714/15 |
| 2015/0116026 A1* | 4/2015 | Kang | | H02M 5/2573 |
| | | | | 327/452 |
| 2015/0195101 A1* | 7/2015 | Rashid | | H04W 4/80 |
| | | | | 700/90 |
| 2016/0171102 A1* | 6/2016 | Pandya | | H04L 69/161 |
| | | | | 712/7 |
| 2016/0366158 A1* | 12/2016 | Feng | | H04L 63/145 |
| 2017/0180394 A1* | 6/2017 | Crofton | | G06F 21/64 |
| 2018/0096148 A1* | 4/2018 | Sejtko | | G06F 21/566 |
| 2018/0234266 A1* | 8/2018 | Rudolph | | H04L 67/12 |
| 2018/0234326 A1* | 8/2018 | Swierk | | H04L 67/303 |
| 2018/0341769 A1* | 11/2018 | Aoyama | | G06F 21/56 |
| 2018/0349623 A1* | 12/2018 | Morard | | G06F 21/53 |
| 2019/0005239 A1* | 1/2019 | Park | | G06F 21/563 |
| 2019/0197535 A1* | 6/2019 | Rice | | G06Q 20/204 |
| 2019/0258251 A1* | 8/2019 | Ditty | | G06K 9/00805 |
| 2020/0003659 A1* | 1/2020 | Davies | | G01R 19/2513 |
| 2020/0304603 A1* | 9/2020 | Keini | | H04L 69/03 |
| 2021/0256127 A1* | 8/2021 | Miserendino | | G06F 21/56 |

FOREIGN PATENT DOCUMENTS

| | | | | |
|---|---|---|---|---|
| WO | WO-2007079095 A2 * | 7/2007 | | G06F 16/90344 |
| WO | WO-2010127173 A2 * | 11/2010 | | H01L 43/18 |

* cited by examiner

FIG. 1

```
695331c75c4aee7ebef21324db383ed1    /bin/busybox    -rwxr-xr-x   1    281296 Sep
27 20:47    /bin/busybox
            695331c75c4aee7ebef21324db383ed1    /bin/sh   lrwxrwxrwx   1        7 Sep
27 20:00 /bin/sh ->busybox
            f20224df9782676e883e0e420b902079    /var/log/system.log    -rw------
-       1     131096 Nov    5 13:45 /var/log/system.log
```

FIG. 2A

```
695331c75c4aee7ebef21324db383ed1    /bin/busybox    -rwxr-xr-x   1    281296
Sep 27 20:47    /bin/busybox
            695331c75c4aee7ebef21324db383ed1    /bin/sh   lrwxrwxrwx   1        7 Sep
27 20:00 /bin/sh ->busybox
            b15b63a2c7974cd15810012778c78ac28   /var/log/system.log    -rw------
-       1     131096 Nov    5 16:12 /var/log/system.log
```

FIG. 2B

```
$ ./idb.pl known_good_filesystem_inventory*.txt
system_under_test_filesystem_inventory.txt
    Test filename is: system_under_test_filesystem_inventory.txt
    Parsing file into main db: known_good_filesystem_inventory1.txt
    Parsing file into main db: known_good_filesystem_inventory2.txt
    Parsing file into main db: known_good_filesystem_inventory3.txt
    Analyzing test file: system_under_test_filesystem_inventory.txt
    (Ignoring filter match on /etc/config.cfg of attr hash)
    (Ignoring filter match on /etc/config.cfg of attr time)
    (Ignoring filter match on /etc/config.cfg of attr hash)
    (Ignoring filter match on /sys/module of attrhardlinks)
    (Ignoring filter match on /sys/module of attrhardlinks)
    (Ignoring filter match on /var/etc/config.cfg of attr hash)
    (Ignoring filter match on /var/etc/config.cfg of attr size)
    (Ignoring filter match on /var/etc/config.cfg of attr time)
    (Ignoring filter match on /var/etc/config.cfg of attr hash)
    (Ignoring filter match on /var/etc/config.cfg of attr size)
    (Ignoring filter match on /var/etc/config.cfg of attr time)
    (Ignoring filter match on /var/log/system.log of attr hash)
    (Ignoring filter match on /var/log/system.log of attr hash)
    (Ignoring filter match on /var/log/system.log of attr hash)
    !!! Unexpected file only in test db: /var/malicious_file_found_by_scan
    Analysis results: -----------
DB Comparisons: 11479
DB count of fs inventories: 3
Different attr OK: 1160
Files in test db: 3863
Filtered attributes: 14
Unexpected difference in day: 3
Unexpected difference in hash: 6
Unexpected files: 1
```

DETECTION OF SUSPICIOUS OBJECTS IN CUSTOMER PREMISES EQUIPMENT (CPE)

BACKGROUND

Customer premises equipment (CPE) such as routers, modems, home gateways, set top boxes, media centers, consumer appliances, for example, require firmware and/or software applications that are used to perform functions that implement the feature set offered by the CPE. Even within a given class, type or model of CPE (e.g., routers) from the same manufacturer, individual CPEs may have different features implemented depending on the environment in which they are to operate and because of end user and service provider preferences. As a consequence, software platforms employed on different devices of the same type and even the same model may differ in minor or major ways to support operation in the different environments.

Manufacturers or service providers may provide integrity check software that is used to ensure that a malicious individual or entity has not tampered with the firmware and/or software applications that are provisioned on the CPE, or added malicious files or other software. However, because the firmware and/or software applications used on individual CPEs of a given class, type or model may have numerous differences large and small, it may be difficult to provide integrity check software that can identify malicious items across all CPEs of the given class, type or model.

SUMMARY

In accordance with one aspect of the subject matter disclosed herein, a method is provided of validating an inventory of files in a file system of a customer premises equipment (CPE). In accordance with the method, each file for the file system of a test CPE being tested is compared to entries in a validated file system database. The entries are obtained by operating under a series of different operating conditions one or more validated CPEs of a type to which the test CPE belongs. The entries collectively define an inventory of files in the file system of the one or more validated CPEs after operating the one or more validated CPEs under the series of different operating conditions. The validated one or more CPEs each have an uncorrupted file system that has not been tampered with in an unauthorized manner. Any file in the file system of the test CPE that is not also present in the validated file system database is identified as a suspicious file. For each file in the file system of the test CPE that is also present in the validated file system database, each attribute of the file is compared to attributes of a corresponding file in the validated file system database only if the attributes of the corresponding file in the validated file system database do not change in value after operating the one or more validated CPEs under the series of different operating conditions. Any attribute of the file in the test CPE being compared is identified as suspicious if a value of the attribute of the file in the test CPE does not match a value of the attribute of the corresponding file in the validated file system database. A notification is issued of any suspicious files and suspicious attributes that have been identified.

In accordance with another aspect of the subject matter disclosed herein, a method is provided for creating a database of files from one or more validated CPEs for performing an integrity check on file systems of other CPEs of the same type. In accordance with the method, one or more validated CPEs are operated under a series of different operating conditions. The validated one or more CPEs each have an uncorrupted file system that has not been tampered with in an unauthorized manner. Files from a file system of the one or more validated CPEs are read after operating at least one of the validated CPEs under each of the different operating conditions to obtain an inventory of files for the one or more validated CPEs when operating under each different operating condition. The file system inventories are combined into a superset of all files. A database is created from the superset of all files that is arranged in a format that is able to read by a program that performs an integrity file check on a test CPE of a type to which the one or more validated CPEs belong.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

BRIEF DESCRIPTION OF THE DRAWINGS

FIG. 3 shows one example of the results from a shell script that is run on a CPE under test.

DETAILED DESCRIPTION

Customer premises equipment (CPE) may be any device such as a router, modem, home gateway, set top box, media center, consumer appliance and so on, which has a file system consisting of firmware and/or software applications such as system files or other objects that are installed by, caused to be installed by, or authorized to be installed by, the manufacturer and/or system operator. That is, the CPE may have firmware and/or software applications that can be treated as being a normal set of files that belong in the CPE and which can be distinguished from other firmware and/or software applications such as user files that, if installed, may be treated as suspicious files that potentially may be a result of malicious tampering. For instance, a set top box may include a digital video recorder (DVR) that has video programs recorded by the user. The programs are stored in user files that are easily distinguished from the system files that are to undergo an integrity check using the techniques described herein. In some cases the CPE may be an embedded system that has dedicated functions for performing a specified, limited set of tasks.

Figure 1:
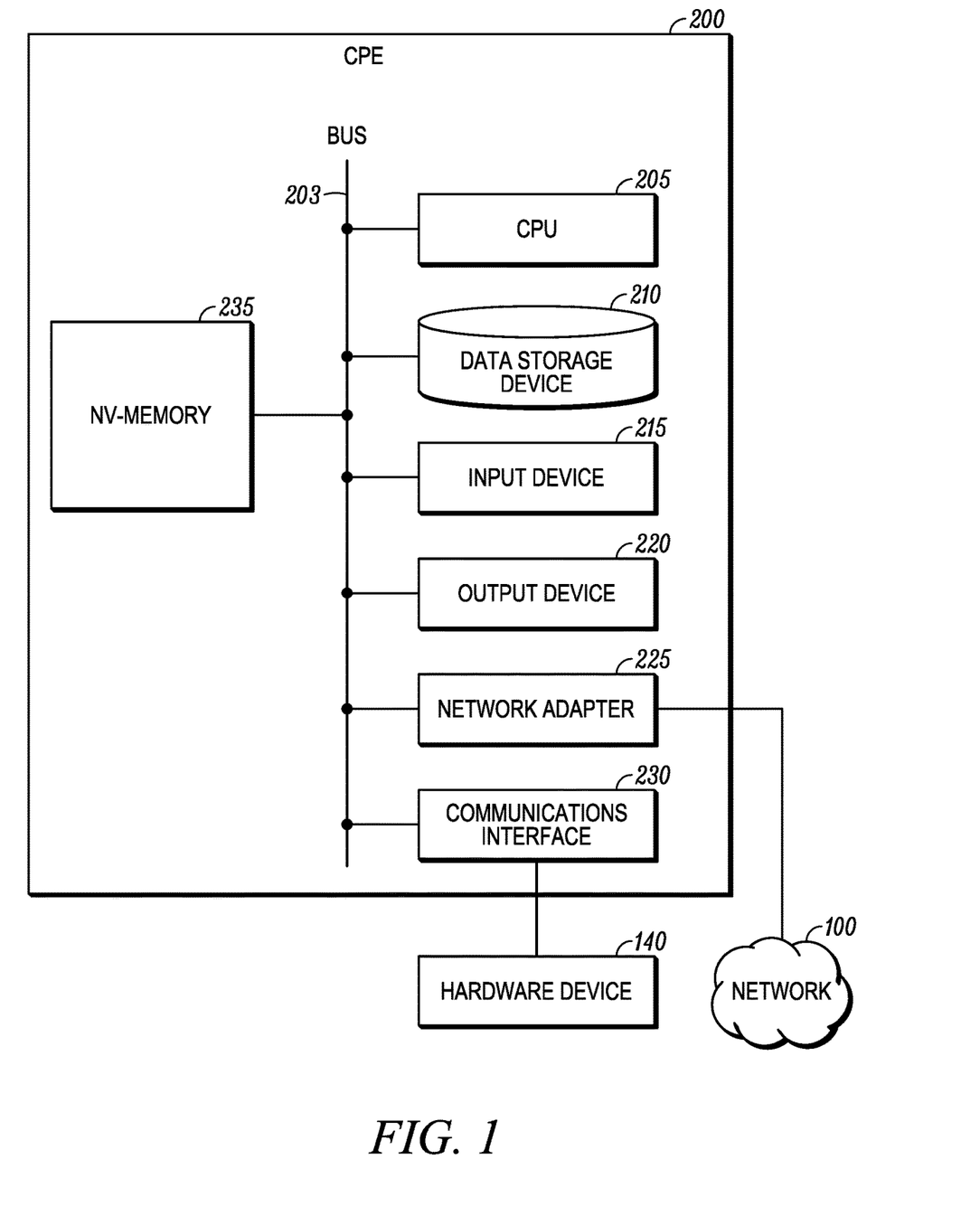
FIG. 1 shows a schematic diagram of one example of a generalized CPE to which the techniques described herein may be applied.

FIG. 1 shows a schematic diagram of one example of a generalized CPE to which the techniques described herein may be applied. It should be noted that any particular CPE may have additional or fewer components than shown herein, including specialized components tailored to the features and functionality of the particular CPE. A central processor unit (CPU) 205, data storage device 210 (such as a disk drive, flash drive, flash memory, or the like), input device 215 (such as a keyboard, keypad, touchscreen, or the like), output device 220 (such as a monitor, graphic display, or the like), network adapter 225, communications interface 230, and non-volatile memory 235 are all in communication with one another over a bus 203. The network adapter 225 transmits and receives network traffic for the CPE 200. In one embodiment, the network adapter 225 connects to a network 100 (e.g., the Internet, a hybrid-fiber-coax network, etc.) and is the mechanism that facilitates the passage of network traffic between the CPE 200 and the network 100. The communications interface 230 is the mechanism that facilitates the transmission and receipt of data between the CPE 200 and an external hardware device 140. In various embodiments, the communications interface 230 may be a USB interface, a Bluetooth interface, or the like.

The CPU 205 executes sequences of operational instructions that comprise computer programs resident in, or operative on, the non-volatile memory 235. Firmware and application software are loaded into nonvolatile memory 235 by the manufacturer and/or a system operator. Firmware and application software may be pre-installed prior to delivery at the customer premises and/or after installation at the customer premises by downloading software objects to the CPE 200 over the network 100. These various versions of firmware and application software are designed to be applicable in a variety of different CPE environments depending on the features and functions to be performed by the CPE 200. Additional firmware and application software, and updates to previously installed firmware and application software, may also be periodically downloaded to the CPE 200 over the Internet 100. These additions and updates may cause differences among firmware and application software on different CPEs to increase as time goes on.

As previously mentioned, system operators or other service providers want to ensure that the firmware and/or software applications that are provisioned on their CPEs deployed in the field have not been tampered with and do not contain any unauthorized malicious files or other software that may have been added by a malicious entity. Because of variations in the firmware and application software that may exist from CPE to CPE of the same type, class, model, etc. from the same manufacturer, simply comparing the files on a CPE being examined to a list of pre-installed firmware and application software is not sufficient. For simplicity of exposition, CPEs of the same type, class, model, etc., from the same manufacturer are referred to hereinafter as CPEs of the same type.

To address this problem, an inventory is obtained of the file systems on validated CPEs (i.e., CPEs that are known not to have been tampered with) that have been allowed to operate under different circumstances and in different environments that correspond to those that may be found in CPEs deployed in the field. That is, a database is developed containing a file system inventory of a validated CPE operating in different scenarios or under different operating conditions that may include, without limitation, different networks, different service provider configurations and different end user feature settings. The validated CPE will be allowed to operate in these different scenarios so that an inventory of files and their attributes may obtained at different times, such as after a reboot, after a change in software feature configurations, and so on.

The inventory of the files on the validated CPE will contain values of attributes for each file. For each file such attributes that are inventoried may include, without limitation, any or all of the following: file size, the date/time of file creation, last read and modification, the number of referencing hard links, a file descriptor in is attributes (e.g. "d" for directory, "l" for link, "-" for a regular file), permissions: (e.g., read/write/execute for each of an owner, a specified group, anyone), the file owner and group, the link target path/filename and a cryptographic hash (signature) of the file contents. The inventories obtained from each different scenario or operating condition are combined into a single validated file system database so that the inventory obtained from a CPE to be tested can be compared to the superset of inventories in the database that are obtained from the validated CPEs.

The inventory of the CPE being tested may be acquired and analyzed by a suitable software program. In one embodiment, the software program may be a script that is downloaded and installed by the service provider when an integrity check is to be performed. While any script language may be employed, in one particular embodiment, the script may be a shell script, which uses the scripting language made available by the operating system used on the CPE. A shell script may be advantageous because it requires trusted shell access to use and because it can be downloaded to run in the shell script's runtime memory so that it is only present when needed and thus is does not remain resident on the CPE at other times, where it could be susceptible to tampering. Thus, a shell script can be used when the CPE is a remotely managed device that can be accessed by the service provider over a secure management channel. In other embodiments, if the service provider does not have shell access, the software program may be installed as part of the system firmware.

Once a file system inventory of the CPE system under test is obtained, each entry in the inventory is compared to the entries in the validated file system database to identify unexpected discrepancies. In particular, each file in the inventory is compared to determine if it exists in the validated file system database. If not, then the file is classified as suspicious. Then, for each remaining file in the inventory, the value of each file attribute is compared to the value of that same file attribute in the validated file system database, provided that there is a consistent value for that file attribute across all the different operating scenarios that have been included in the database. If the attribute values do not match, the attribute is classified as suspicious. If a particular attribute does not have a consistent value in the database across all the different operating scenarios that have been included in the database, no comparison is made to the attribute value of the file in the inventory of the CPE under test. Finally, a situation will be flagged as suspicious if any files that exist in the validated file system database across all the different operating scenarios that have been included in the database are not found in the file system inventory of the CPE system under test. A notification may be issued if any suspicious files or attributes are identified. Such notification may be presented to the end user, the service provider and/or other entity, any of whom make take appropriate action.

In some embodiments the script may include one or more filter rules that are used to filter out prior to analysis selected files that normally vary between systems and between bootups on a given system. Such files should not be compared to the entries in the validated file system database. Each filter rule includes 1) a regular expression or a wildcard expression filename for identifying files to be ignored and 2)

a list of attributes that are to be bypassed so that they are not compared to attribute values in the validated file system database. During the analysis, if a file being inspected matches a filename listed in the filter rules, then the attributes in the list of attributes in the filter rule are ignored. That is, the value for a file's attribute is ignored so that no comparison is made if there is a filter rule that 1) matches the filename and 2) contain the attribute in its attribute list.

Figure 2A:
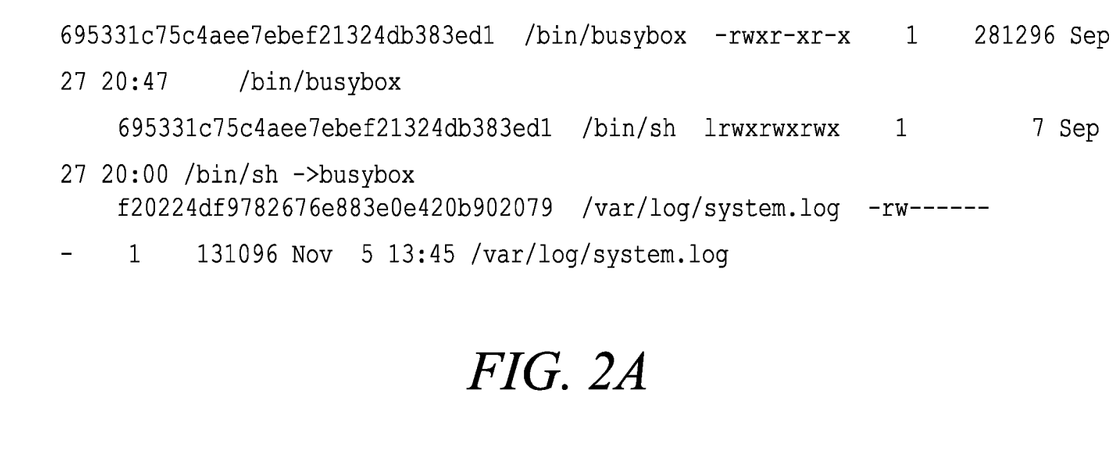
FIG. 2A shows three entries obtained by a shell script from the file system of a validated CPE taken at some given time and FIG. 2B shows the same three entries obtained from the file system of the same validated CPE, but taken at a later time.
Figure 2B:
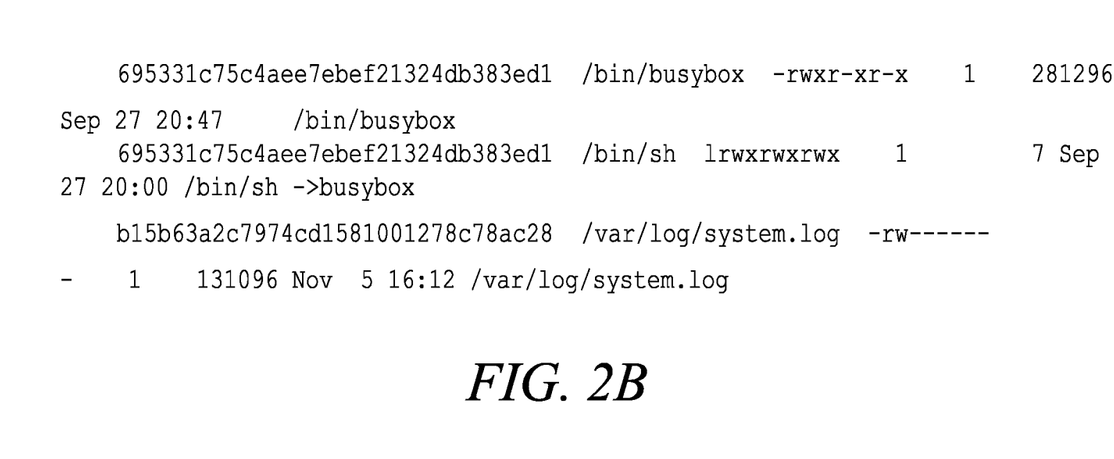

FIG. 2A shows three entries obtained by a shell script from the file system of a validated CPE taken at some given time. Each entry shows a cryptographic hash of the file and directory information. FIG. 2B shows the same three entries obtained from the file system of the same validated CPE, but taken at a later time. A comparison of FIGS. 2A and 2B shows that the first two entries are completely unchanged, with the executable file busybox (and the sh alias linking to it,) being unchanged. The last entry (for/var/log/system.log) has some attributes that have changed: the modification time and the cryptographic hash of the file contents. This modification to the cryptographic hash indicates that the content of the file has changed.

FIG. 3 shows one example of the results from a shell script that is run on a CPE under test. In this example an unexpected file is found on the CPE. That is, a file in the file system inventory obtained from the CPE under test does not match any file the validated file system database. A comparison of some attributes in FIG. 3 have been skipped because of filter rules or because they do not have a consistent value in the validated file system database. These attributes typically involve configuration and log files that change under normal operating conditions.

Figure 4:
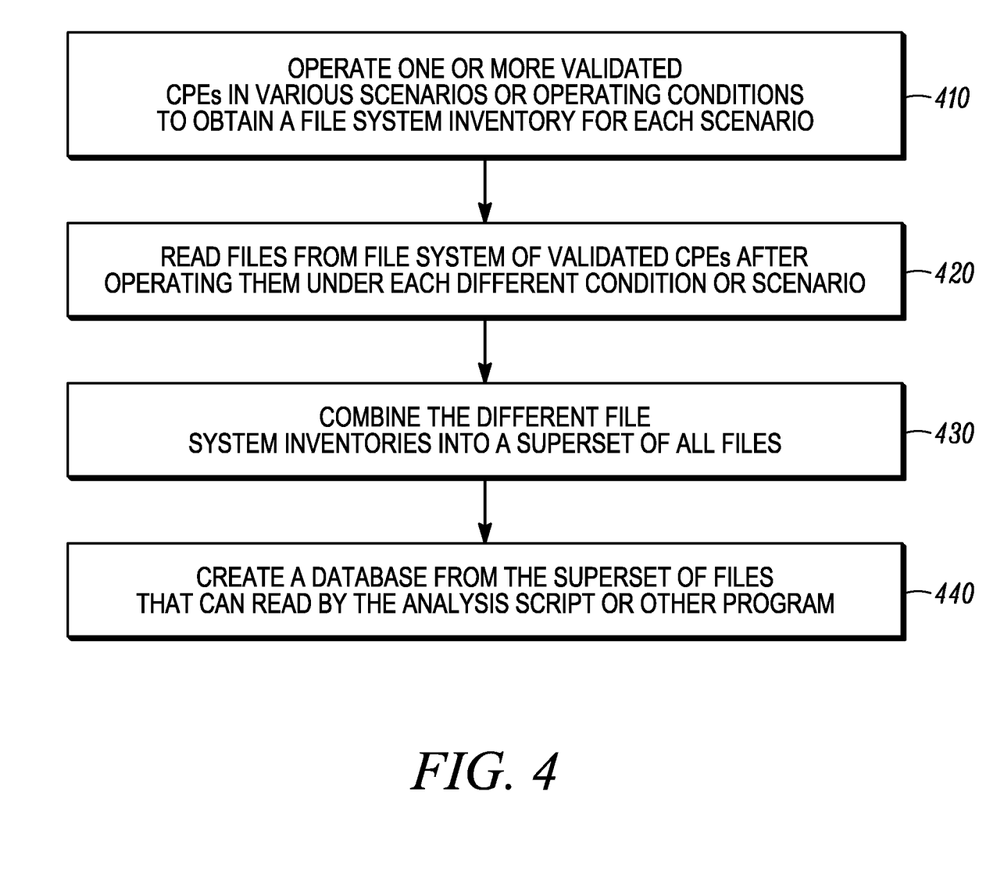
FIG. 4 is a flowchart illustrating one example of a method for creating a validated database of files and their attributes for a given type/model of one or more CPEs that have been validated as having an uncorrupted file system.

FIG. 4 is a flowchart illustrating one example of a method for creating a validated database of files and their attributes for a given type/model of one or more CPEs that have been validated as having an uncorrupted file system. The method begins at block 410 when the validated CPE is operated under various operating conditions or scenarios to obtain to a file system inventory for each different condition or scenario. The different operating conditions or scenarios may include different operating environments (e.g., different networks with which the CPE may operate), different times of operation (e.g., before and after a reboot), different feature configurations, and so on. The files, including their various attributes, are read from the validated CPEs after operating them under each of the different scenarios or operating conditions. At block 420. The file system inventory includes a list of each file and the values of the various attributes associated with those files. Next, at block 430 the different file system inventories are merged into a superset of all the various files and their attributes. Finally, at block 440 a database is created from the superset of files. The database is arranged so that it can read by the analysis script or other program that is used to obtain the inventory from a CPE of the same type/model that is to be tested for malicious tampering.

Figure 5:
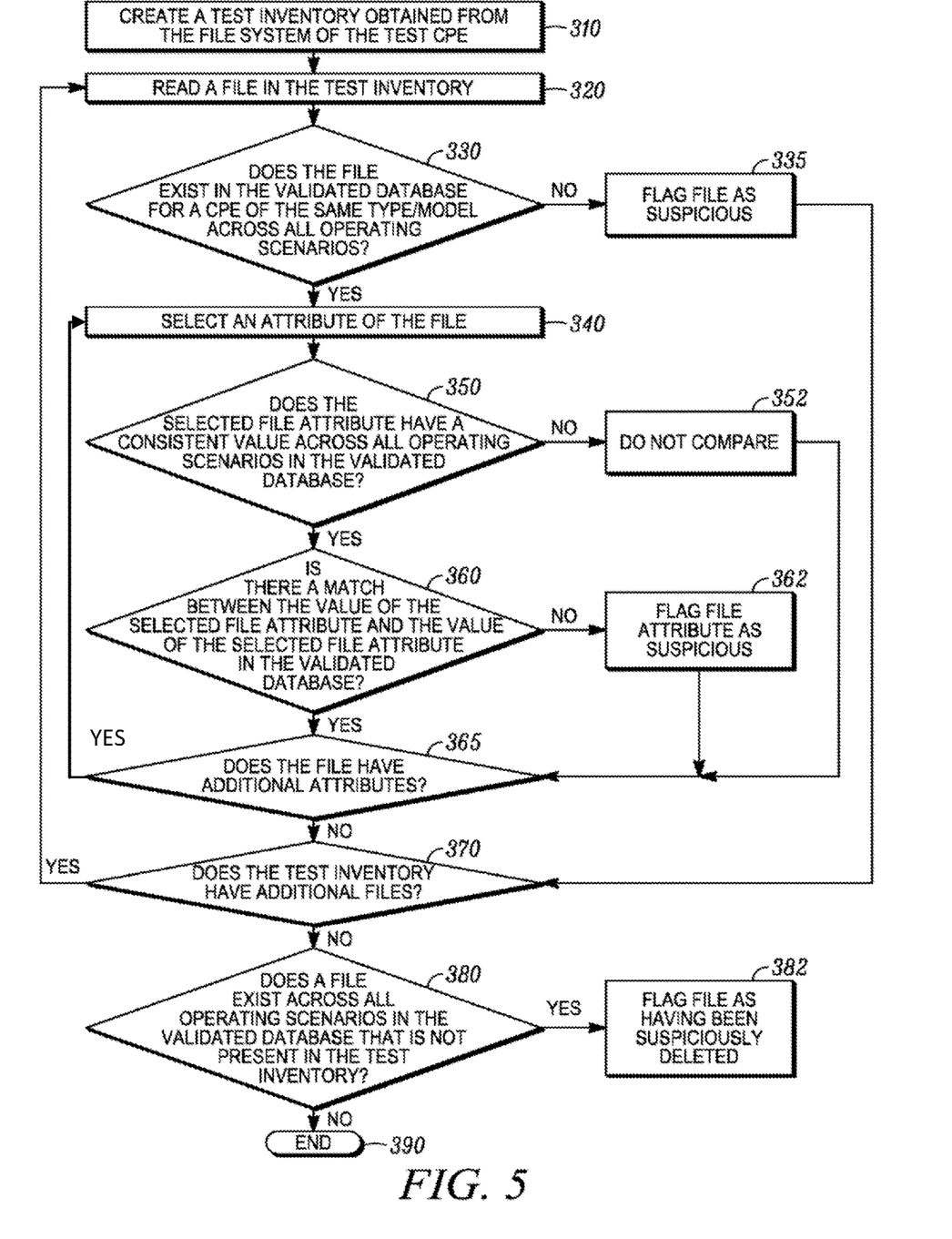
FIG. 5 is a flowchart illustrating one example of a method for determining if there are any suspicious files in the file system of a CPE being tested.

FIG. 5 is a flowchart illustrating one example of a method for determining if there are any suspicious files in the file system of a CPE being tested. The method assumes that a validated database of files and their attributes has been created for a CPE of the same type or model operating under a range of different operating conditions. An example of a method for creating such a database has been illustrated in FIG. 4.

The method begins at block 310 by creating a test inventory of the files and their attributes on the CPE being tested. In one embodiment the test inventory may be created by the same program that is used to compare the files and their attributes in the test inventory to the files and their attributes in the validated database. In other embodiments separate programs may be used for creating the test inventory and for comparing the test inventory against the validated database.

The method continues at block 320, where a file in the test inventory is read by the analysis program. As previously mentioned, in one embodiment the analysis program may be a script such as a shell script that is pasted by the service provider into the shell script's runtime memory on the CPE being tested. At decision block 330 the analysis program determines if the file exists in the validated database. If not, then the file is flagged as being suspicious at block 335 and the method proceeds to block 370 to determine if there are additional files to be examined. If on the other hand the file does exist in the validated database, the method proceeds to block 340 where one of the attributes of the file is selected.

The analysis program then determines at block 350 if the selected file attribute has a consistent value across all the operating scenarios included in the validated database. If not, the method proceeds to block 352 where the attribute is ignored so that no comparison is performed, after which the method proceeds to block 365 to determine if there are additional attributes to be examined. If on the other hand the attribute value is consistent across all operating scenarios included in the validated database, the value of the selected file attribute in the test inventory is compared to the value of the file attribute in validated database at block 360. If the values do not match the attribute is flagged as suspicious at block 362 and the method again proceeds to block 365 to determine if there are additional attributes to be examined. If instead the values match at block 360, the method proceeds directly to block 365 to determine if there are any remaining attributes for the file that has been selected. If so, then the method returns to block 340 to select another attribute. If not, the method proceeds to block 370 to determine if the test inventory has any additional files that have not yet been examined. If so, the method returns to block 320 to read another file. If not, the method next continues at block 380 where the analysis program determines if a file exists across all operating scenarios in the validated database that is not present in the test inventory. If so, the file is flagged as having been suspiciously deleted at block 382. Finally, the method terminates at block 390.

As disclosed herein, the term "memory," "memory unit," "storage drive or unit" or the like may represent one or more devices for storing data, including non-volatile memory (e.g., ROM, EPROM, flash memory), random access memory (RAM), magnetic RAM, core memory, magnetic disk storage mediums, optical storage mediums, or other computer-readable storage media for storing information. The term "computer-readable storage medium" includes, but is not limited to, portable or fixed storage devices, optical storage devices, a SIM card, other smart cards, and various other mediums capable of storing, containing, or carrying instructions or data. However, computer readable storage media do not include transitory forms of storage such as propagating signals, for example.

Although described specifically throughout the entirety of the instant disclosure, representative embodiments of the present invention have utility over a wide range of applications, and the above discussion is not intended and should not be construed to be limiting, but is offered as an illustrative discussion of aspects of the invention.

What has been described and illustrated herein are embodiments of the invention along with some of their variations. The terms, descriptions and figures used herein are set forth by way of illustration only and are not meant as limitations. Those skilled in the art will recognize that many variations are possible within the spirit and scope of the embodiments of the invention.

The invention claimed is:

1. A method of validating an inventory of files in a file system of a customer premises equipment (CPE), comprising:

operating one or more validated CPEs of a same class or model to which a test CPE belongs under a series of different operating conditions, the different operating conditions including operating the CPE in different networks, operating the CPE with different service provider configurations, and operating the CPE with different end user feature settings;

reading files and their corresponding attributes of the one or more validated CPEs at different times during each of the different operating conditions to obtain inventories of files for the one or more validated CPEs;

combining the inventories of files for the one or more validated CPEs to create a validated file system database that includes entries related to the files and their corresponding attributes of the one or more validated CPEs at different times during the series of the different operating conditions;

comparing each file for the file system of the test CPE being tested to the entries in the validated file system database, the validated one or more CPEs each having an uncorrupted file system that has not been tampered with in an unauthorized manner;

identifying any file in the file system of the test CPE that is not also present in the validated file system database as a suspicious file;

for each file in the file system of the test CPE that is present in the validated file system database, determining if each selected file attribute has a corresponding value for all of the series of different operating conditions included in the validated database and, if not, ignoring the selected file attribute, and if each selected file attribute has a corresponding value for all of the series of different operating conditions included in the validated database, comparing each selected attribute of the file to a corresponding attribute of a file in the validated file system database;

identifying any attribute of the file in the test CPE being compared as suspicious if a value of the attribute of the file in the test CPE does not match a value of the corresponding attribute of the file in the validated file system database; and issuing a notification of any suspicious files and suspicious attributes that have been identified.

2. The method of claim 1, wherein the test CPE is selected from the group consisting of a router, modem, home gateway, set top box, media center and a consumer appliance.

3. The method of claim 1, further comprising performing the comparing and the identifying using a script.

4. The method of claim 3, wherein the script is a shell script.

5. The method of claim 4, further comprising downloading the shell script to the test CPE over a service provider network with which the test CPE is associated.

6. The method of claim 1, further comprising identifying any file that is present in the validated file system database after operating the one or more validated CPEs under each of the series of different operating conditions and not present in the file system of the test CPE as a suspiciously missing file.

7. The method of claim 1, further comprising, prior to comparing each file for the file system of the test CPE to the entries in the validated file system database, applying one or more filter rules to filter out prior selected files from the file system of the test CPE.

8. The method of claim 7, wherein the one or more filter rules include: 1) a regular expression or a wildcard expression filename for identifying files to be ignored, and 2) a list of attributes that are to be bypassed so as not to be compared to attribute values in the validated file system database.

9. The method of claim 1, wherein each file in the validated file system database includes attributes including: file size, date/time of file creation, last read and modifications, a number of referencing hard links, a file descriptor, permissions, a file owner and group, a link target path/filename and a cryptographic hash signature of the file contents.

* * * * *